United States Patent [19]

Konicke et al.

[11] Patent Number: 4,860,007

[45] Date of Patent: Aug. 22, 1989

[54] INTEGRATED PRIMARY FLIGHT DISPLAY

[75] Inventors: Michael L. Konicke, Everett; James E. Veitengruber, Bellevue; James C. Loesch, Seattle, all of Wash.

[73] Assignee: The Boeing Company, Seattle, Wash.

[21] Appl. No.: 144,512

[22] Filed: Jan. 15, 1988

[51] Int. Cl.⁴ .............................................. G01C 23/00
[52] U.S. Cl. ..................................... 340/173; 73/179; 244/1 R; 340/977; 340/979
[58] Field of Search .......................... 340/971, 973–979; 364/433–435; 73/178 R, 178 T, 179, 182, 183; 244/1 R

[56] References Cited

U.S. PATENT DOCUMENTS

| | | |
|---|---|---|
| 2,019,234 | 10/1935 | Nistri . |
| 2,217,564 | 10/1940 | Scriba ........................... 73/179 |
| 2,366,346 | 1/1945 | Malone ........................ 340/975 |
| 3,344,665 | 10/1967 | Anthony . |
| 3,355,733 | 11/1967 | Mitchell et al. . |
| 3,381,656 | 5/1968 | Ohnikian et al. ............ 340/977 |
| 3,545,269 | 12/1970 | Sherbert, Jr. ................... 73/179 |
| 3,577,120 | 5/1971 | Sherbert, Jr. ................ 340/973 |
| 3,668,622 | 6/1972 | Gannett et al. . |
| 4,247,843 | 1/1981 | Miller et al. ................ 340/973 |
| 4,326,189 | 4/1982 | Crane ......................... 340/973 |
| 4,583,094 | 4/1986 | Mosier ........................ 340/975 |

Primary Examiner—Joseph A. Orsino
Assistant Examiner—Brent A. Swarthout
Attorney, Agent, or Firm—Dellett, Smith-Hill & Bedell

[57] ABSTRACT

An integrated primary flight display apparatus for an aircraft provides coordinated information with minimum eye scan distances. Various cathode ray tube generated presentations are centered toward a common electronic attitude director indicator having indicia thereadjacent and pointers centrally directed. A moving altitude scale is utilized with a fixed vertical speed scale employed to select the correct vertical speed for leveling off at a given altitude. An arcuate shaped heading indication is expanded in angular extent to achieve enhanced sensitivity.

12 Claims, 3 Drawing Sheets

INTEGRATED PRIMARY FLIGHT DISPLAY

BACKGROUND OF THE INVENTION

The present invention relates to primary flight displays and particularly to an improved primary flight display apparatus for optimizing the coordination and integration between display elements.

Various flight data instruments necessarily occupy a great deal of space on an aircraft control panel and require considerable concentration and comparatively long eye scan distances on the part of the pilot in properly observing all the instruments. Consequently, integrated primary flight displays have been developed which combine air data and basic flight information on the face of a comparatively small cathode ray tube. However, such primary flight displays tend merely to gather data for simultaneous presentation in the same small area without necessarily coordinating the various display scales in a manner that will aid the pilot in flying the aircraft. Also, minimum scan distances between the various instrument scales are not always attained.

SUMMARY OF THE INVENTION

In accordance with the present invention in a particular embodiment thereof, various air data scales are coordinated to provide minimum eye scan therebetween, with the various scales being adjacent a central electronic attitude director indicator and provided with inwardly directed pointers. An altitude scale and a vertical speed scale are positioned adjacent one another on the same side of the attitude director indicator wherein the altitude scale is provided with a pilot selected marker or "bug" for indicating the altitude to which the pilot wishes to fly. When the pointer associated with the vertical speed scale is directed toward the selected altitude on the altitude scale, the proper vertical speed is attained and indicated for flying to such altitude. As the pilot maintains the pointing relationship, the vertical speed will decrease as the desired altitude is approached and the airplane levels off properly.

Enhanced sensitivity for a heading scale forming part of the primary flight display is achieved by providing a magnified compass rose with degree graduations farther apart than the angle subtended by the graduations at the apparent center of curvature of the rose, thereby optimizing sensitivity while maintaining a realistic heading representation.

It is accordingly an object of the present invention to provide an improved primary flight display which is more "flyable" than those heretofore available.

It is another object of the present invention to provide an improved primary flight display characterized by enhanced cooperation and coordination between data supplied.

It is a further object of the present invention to provide an improved primary flight display requiring minimum scan distance between essential data.

It is another object of the present invention to provide an improved and better coordinated primary flight display characterized by minimized confusion between the varied information presented.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DRAWINGS

FIG. 1 is a front view of an integrated primary flight display provided according to the present invention, FIG. 2 is a block diagram of an overall data system according to the present invention including an integrated display unit, and FIG. 3 is a block diagram of display format circuitry in FIG. 2.

DETAILED DESCRIPTION

Figure 1:
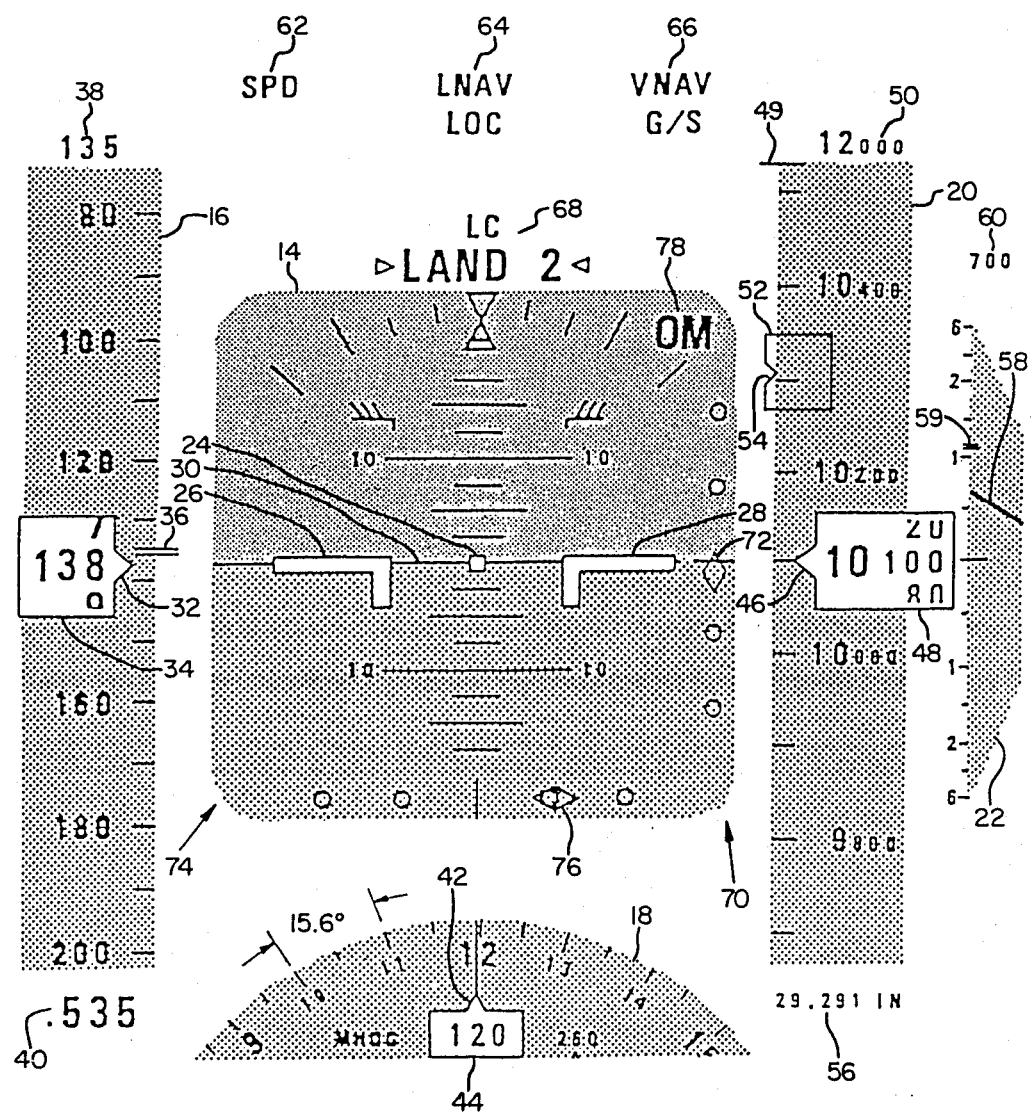
Figure 2:
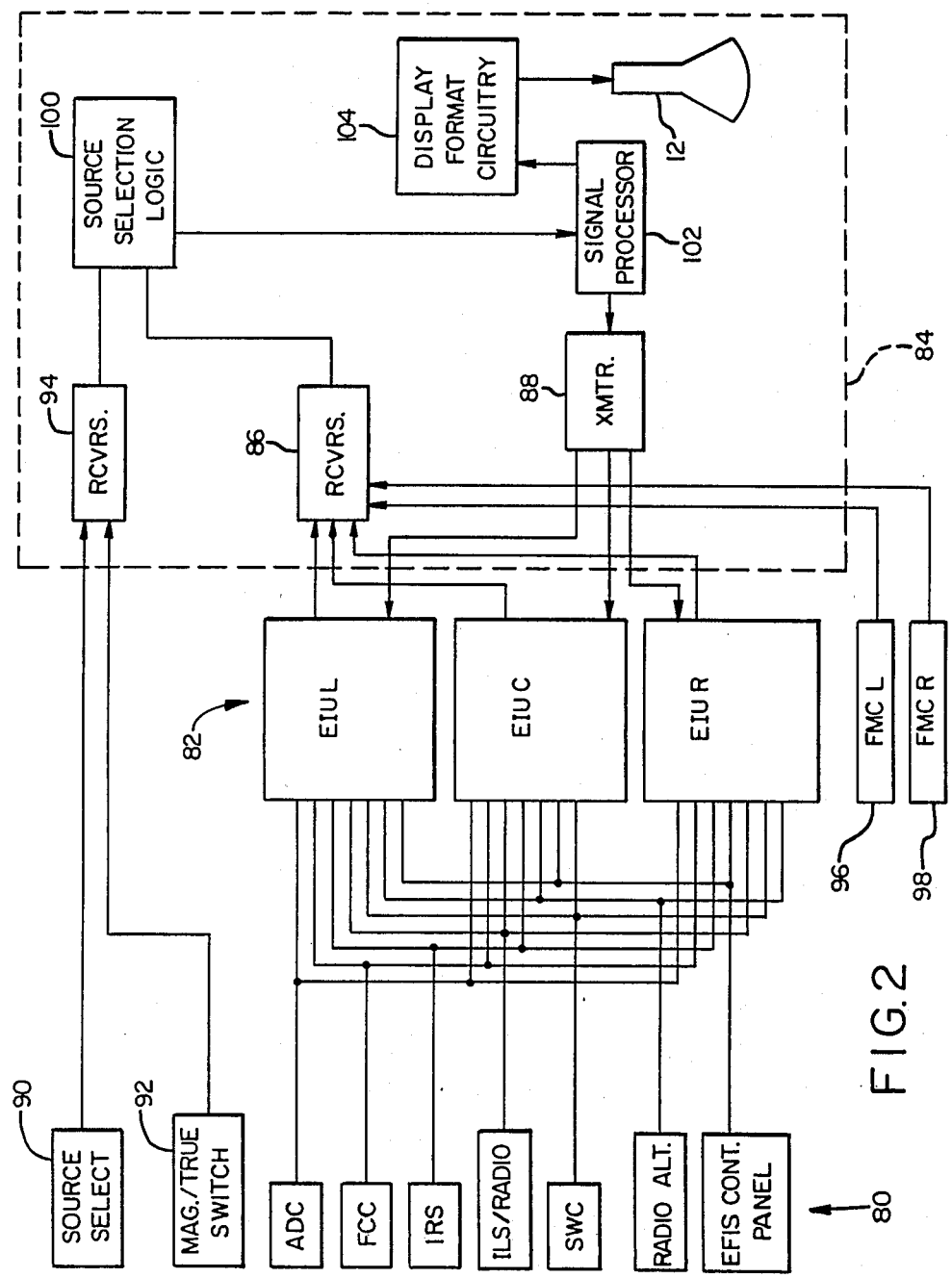

FIG. 1 is illustrative of a display produced according to the present invention and suitably comprises a display field presented on a cathode ray tube screen, e.g., on the screen of cathode ray tube 12 in FIG. 2. The display field is divided into a number of indicators or indicating areas 14, 16, 18, 20 and 22 which are shaded to provide clear demarcation therebetween. This shading comprising light gray background areas is produced by raster scanning of CRT 12.

A first area 14 comprises a centrally located electronic attitude director indicator which is substantially rectangular in shape having a central boresight box 24 representing the airplane longitudinal axis at the center of the box. On either side thereof are conventional, stationary aircraft symbols 26 and 28. An artificial horizon is provided by line 30 between an upper more lightly shaded area representing the sky and a lower darker area for ground shading. The overall presentation by the electronic attitude director indicator 14 is substantially conventional.

Adjacent and along the left hand side of attitude director indicator 14 is an air speed presentation 16 comprising a vertically oriented movable scale or "tape" having graduations representing air speed values along the right hand side thereof, i.e., on the side adjacent the attitude director indicator 14. The air speed indicator further includes a fixed pointer 32 which points inwardly toward the air speed scale as well as toward the center of the attitude director indicator. The pointer is provided with a window 34 digitally indicating the air speed in response to instrumentation of the aircraft. As the air speed changes, the scale or tape moves vertically relative to the pointer 32 which continues to point toward boresight box 24. The tape presents a range of speed values above and below the current speed, e.g., between 80 and 200 knots in the particular illustration, with the numerics being disposed immediately to the left of the corresponding scale graduations. Portions of the scale or tape above and below the viewable range are blanked from the presentation. Moreover, the scale is blanked at the location of window 34 which supplies the numerical readout of the current speed as a "rolling" number. The scale right hand edge of the tape is not obscured by pointer 32 or window 34.

The air speed indicator further includes a pilot controlled marker or "bug" 36 consisting of a pair of adjacent horizontal lines, with the current value of the selected air speed (e.g., 135 knots) being numerically displayed at location 38 above the air speed presentation. When the selected air speed is attained, the marker or "bug" will reach pointer 32. The marker 36 has a parked position at the upper end of the indicator 16 and at the lower end of indicator 16 when the selected air speed is outside the values depicted by the air speed tape, and at such time only one of the horizontal markers will appear at the end of the tape. The mach number is displayed at location 40 at the lower end of the tape.

Indicator 18 for aircraft heading comprises a raster-shaded area having the shape of a segment of a circle or compass rose which is easily comprehensible by the viewer. The indicator 18 is provided with a degree scale along the upper, arc-shaped portion thereof adjacent attitude director indicator 14, and like the previously described indicator 16, the scale of heading indicator 18 moves with respect to a fixed pointer numbered 42 which is upwardly directed toward the center of the display. Immediately below pointer 42 is a window 44 which digitally indicates the present heading. For other than the segment of the heading display as illustrated in FIG. 1, the compass rose is blanked out, and is also blanked at the location of window 44 where the numeric readout is presented. However, neither pointer nor window obscure the upper scale.

In response to heading information from the aircraft instrumentation, either true heading or magnetic heading, the window 44 displays the heading in degrees while the scale at the upper arcuate edge of the indicator is also positioned in response to the instrumentation such that fixed pointer 42 points to the correct indicia as identified by the numerics displayed at ten degree intervals underneath the scale. In response to a change in heading information, the indicator 18 will appear to rotate and the digital readout in window 44 will change appropriately.

One disadvantage with a compass rose type of presentation in a limited space on a primary flight display could be lack of sensitivity on the exposed arc. To optimize sensitivity and the amount of the exposed arc on the heading scale, other than a one-to-one relationship is employed between the actual arc length in degrees and the labeled indices in degrees. The five and ten degrees angular positions on an actual arc in a small space are too close together to provide desired sensitivity and readability of the scale. In the present instance, the ten degree indices on the scale of indicator 18 are actually 15.6 degrees apart on the real arc. In a particular embodiment, ten degree sectors of the indicator 18 display are generated and displayed adjacently as needed, with seven to nine sectors being generated at any one time. Although the graphics for thirty-six such sectors are available in graphic memory, it will be seen they would total appreciably more than 360 display degrees.

For determining the scale expansion as may be employed with a particular display, the available space is ascertained and the number of degrees of heading which are desired to be displayed are specified. The actual number of physical degrees of arc available on the display, $$\phi = 180 - 2[\sin^{-1}[(r-h)/r]]$$

where h is the actual vertical height of indicator 18 at the center thereof, and r is the physical radius of the arcuate upper edge of indicator 18.

If the desired spread in degrees, $\theta$, is say 69°, and if in the particular instance h = 0.9 and r = 2.2, then $$\phi = 180 - 2[\sin^{-1}[(2.2 - .9)/2.2]]$$

$$\phi = 107.6°$$

then $$\phi/\theta = 107.6/69 = 1.56.$$

Therefore, 15.6° are displayed on the indicator for every 10 actual degrees of physical arc in the specific example.

It is seen the indicator 18 has an actual radius from an apparent center of curvature below the heading scale, this radius equalling r in the above expression. However, it is also seen the graduations along the heading scale for indicating degrees of heading have a spacing which is greater than the angle subtended at such apparent center of curvature by the arcuate spacing between graduations.

A further, vertically disposed indicator 20 is located adjacent the right hand side of attitude director indicator 14 in FIG. 1, and is provided with an altitude scale along the left hand side thereof, i.e., adjacent indicator 14. The indicator 20 is further provided with altitude numerics to the right of appropriate indicia on the scale. The indicator is of the moving scale or moving tape type wherein the scale moves with respect to fixed pointer 46 as the altitude of the aircraft changes. Fixed pointer 46 includes an adjacent window within which the correct altitude is digitally displayed in rolling number fashion. Thus, as altitude information from aircraft instrumentation changes, both the numerical indicia in window 48 and the position of the underlying tape change accordingly.

Altitude indicia for altitudes above and below the range depicted on the viewable scale or tape, here approximately eight hundred feet, are blanked, as is the scale beneath window 48. Pointer 46 and window 48 do not block the view of indicia along the left hand side of indicator 20, but points fixedly toward such indicia, and at the center of attitude director indicator 14.

The altitude indicator 20 further includes a marker or "bug" which is pilot positionable along the left hand side of the scale. Two types of markers are illustrated in FIG. 1, but it is understood only one of these would normally be employed in an actual display. Marker 49 represents a pilot selected altitude which is off the scale of indicator 20 and is numerically represented at location 50, e.g., 12000 feet in this case. Marker 49 is shown in parked position, with only one of two horizontal lines being displayed since the selected altitude is off scale. If the selected altitude were within the displayed scale, marker 49 would be displayed as two horizontal lines, in the manner of marker 36 cooperating with the air speed scale.

A second, box-like marker or bug 52 having a centrally inwardly directed pointer 54 is also illustrated which is pilot positionable along the left hand edge of the scale, with the arrow 54 pointing at a desired altitude in sliderule fashion. The digital readout at position 56 at the lower end of indicator 20 represents the barometric setting in inches of mercury.

The display of FIG. 1 also includes a vertical speed indicator 22 calibrated in thousands of feet per minute along the left hand side thereof adjacent indicator 20. The shaded area comprising indicator 22 is somewhat trapezoidal in shape, widening toward indicator 20, and is provided with a movable pointer 58 adapted to indicate the current vertical speed of the aircraft by pointing to the indicia of the scale along the left hand side of indicator 22. The last mentioned scale is fixed in position. Pointer 58 is angularly movable from an apparent origin to the right of the scale, from which the pointer appears to extend radially outwardly. Not only does pointer 58 point to indicia along the left hand side of fixed vertical speed scale of indicator 22, it is also used to point toward a selected altitude on the altitude scale of indicator 20, here identified by the aforementioned marker or bug 52.

After the pilot selects a desired altitude and marker 52 identifies the same, the vertical speed of the aircraft can be controlled so that pointer 58 points toward the selected altitude, and under these circumstances the vertical speed will be optimal for leveling out at the desired altitude. It will be seen that as the desired altitude is approached, and as the vertical speed of the airplane is controlled so that pointer 58 continues to point toward marker 52 while the latter moves downwardly, the vertical speed of the airplane will decrease or the airplane will decelerate in a vertical direction whereby the desired altitude will be attained in an optimized way.

As an additional feature of the indicator 22, the vertical speed scale is expanded toward zero vertical speed to enhance proper deceleration toward the desired altitude. In a specific embodiment, the scale, compressed farther from the zero or center vertical speed index, is piecewise linear between indicia identified by numerics to the left of the indicia. Indicator 20 may be provided with a further marker or bug 59.

It has been found advantageous, in respect to achieving a given change in altitude, that the vertical speed be approximately three times the change in altitude desired, at least for vertical speeds between zero and one thousand feet per minute. The relationship of the scale of indicator 22 to the scale of indicator 20 is adapted to achieve this result as will be appreciated from comparing the scales. In coordinating the two scales, it is generally desirable the altitude scale of indicator 20 be optimized in regard to indicia spacing for best pilot readability and performance, while the scale of indicator 22 is adapted accordingly. The numerical value of the current vertical speed is presented at location 60 above the vertical speed scale.

Other features of the FIG. 1 display include flight mode annunciator readouts 62, 64 and 66 at the top center of the display. The three columns are reserved for autothrottle status, lateral mode status and vertical mode status. It is noted these annunciations are arranged in an order which associates the column content to the display feature in closest proximity. In particular, autothrottle mode is closest to the speed tape, vertical mode is closest to the altitude tape and lateral mode is in the center, relating to the bank scale or heading indicator. Flight director, autopilot and autoland status annunciations are displayed at location 68 immediately above the attitude director indicator center, requiring a very short scan.

In order to maximize the size of the attitude director indicator 14, the localizer and glideslope scales and pointers are positioned inside the sky/ground shading of indicator 14. The localizer and glideslope scales do not appear when an instrument approach is not in progress. Glideslope scale 70, along the right side and just within the boundary of attitude director indicator 14, is provided with a diamond shaped marker 72 which is vertically movable with respect to the scale for indicating glideslope deviation. Localizer scale 74, just within the attitude director indicator shading along the lower edge thereof, is similarly provided with a diamond shaped marker 76 for indicating deviation from the course of a particular localizer beam that the aircraft is following. The annunciation at 78 supplies marker beacon indication, e.g., OM for outer marker.

Referring to FIG. 2, comprising a block diagram of an overall aircraft flight instrument data system including an integrated display unit according to the present invention, the data system receives a number of conventional inputs. These inputs are designated ADC for air data computer, FCC for flight control computer, IRS for inertial reference system, ILS/RADIO for instrument landing system and radio, SWC for stall warning computer, RADIO ALT. for radio altimeter, and EFIS CONT. PANEL for the main electronic flight instrument control panel. ADC is responsive to air data sensors for providing altitude information, air speed information, barometric pressure and vertical speed information. The FCC or autopilot provides flight director commands, autopilot commands and flight mode annunciations 64 and 66 in FIG. 1. Furthermore, the autopilot control panel supplies selected values such as selected heading, selected altitude, selected air speed and selected vertical speed.

Heading information, track information, pitch, roll and inertial vertical speed are derived from the IRS. The SWC supplies stall indications and drives the pitch limit indicator on the attitude director indicator. It also drives stick shaker and barber pole information not shown. The EFIS control panel is employed to input decision height, minimum descent altitude and barometric setting, and also includes toggle switch means to bring up meter scales, not shown.

The described inputs are coupled to each of three redundant electronic interface units 82, EIU L for electronic interface unit left, EIU C for electronic interface unit center and EIU R for electronic interface unit right. These EIUs pass the provided input information to integrated display unit 84 and include storage units for storing the data. The three EIUs also are provided with "cross talk" connections (not shown) for comparison of instrumentation data. If the information stored in one of the EIUs is different from the other two, such information is not passed on to Arinc receivers in integrated display unit 84. The EIUs 82 also receive information from Arinc transmitter 88 in integrated display unit 84 for coordinating information from source selection switch 90 and magnetic/true switch 92 that provide separate inputs to discrete receivers 94. Arinc receivers 86 also receive inputs from redundant flight management computer left (FMC L) 96 and flight management computer right (FMC R) 98, the latter supplying autothrottle flight mode annunciation information 62 in FIG. 1 as well as information regarding additional speed "bugs" (not shown) and maximum operating speed. The input circuitry including receivers 86 and 94 and transmitter 88 is standard.

In integrated display unit 84, source selection logic 100 receives data and selection information from receivers 86 and 94 respectively and switches the information for the selected type of display to signal processor 102 which may comprise a programmed microprocessor for controlling the integrated display unit. Processor 102 supplies feedback information to Arinc transmitter 88 and also provides its principal output data to display format circuitry 104 for operating cathode ray tube 12.

Figure 3:
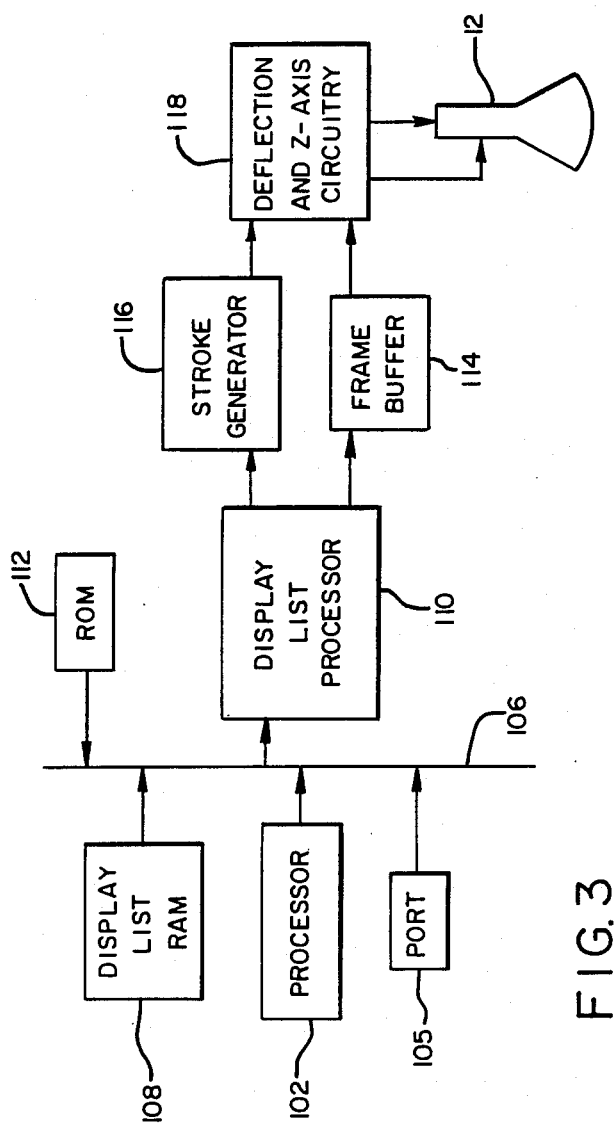

Referring to FIG. 3, more fully depicting the display format circuitry 104 and signal processor 102 of FIG. 1, the aforementioned processor 102 receives input data and supplies output feedback at port 105 via bus 106. The processor, operating under standard routines stored in a read only memory (ROM) 112, maintains a set of graphics display lists which are stored in a random access memory (RAM) 108. Each display list comprises a set of instructions for creating a graphics display of a portion of an indicator 14–22 of FIG. 1 on the screen of CRT 12. Whenever the signal processor 102 receives input data via bus 106 conveying a value to be displayed by one of the indicators, or conveying information from which signal processor 102 may compute a value to be displayed, the signal processor alters the appropriate display lists stored in RAM 108 so that a display produced will indicate such value. For the presentation of the moving scales or "tapes", appropriate calculations are undertaken by processor 102. For example, subtractions are made relative to the altitude information received, for commanding the starting value and the ending value of the altitude tape as appears on the display of FIG. 1. Of course, the rolling digits in readout window 48 are similarly updated.

When the signal processor alters a display list, it transmits the altered display list to display list processor 110. (Display list processor 110 is suitably a separate dedicated or general purpose processor, but it will be appreciated that the function of the display list processor may also be directly implemented by processor 102.) In response to a display list, processor 110 generates and transmits a sequence of display control data either to a frame buffer 114 or to a stroke generator 116 for storage therein. The indicator display of FIG. 1 is produced on a screen of CRT 12 by deflection and Z-axis control circuitry 118 which controls movement and intensity of an electron beam within CRT 12. Frame buffer 114 and stroke generator 116 alternately control beam deflection and intensity of the beam via signals transmitted to circuitry 118 so as to provide a display in accordance with the display control data from display list processor 110.

Display lists define displays in one of two ways. Shading of background areas of indicators 14–22 is determined on a pixel-by-pixel basis by pixel data stored in a bit map memory within frame buffer 114. Display lists defining display of such shaded areas include instructions that tell display list processor 110 which pixels are to be illuminated on the screen of CRT 12. When display list processor 110 receives a display list of this type, it transmits a sequence of address and pixel data to frame buffer 114, the pixel data being stored in the bit-map within frame buffer memory 114 at addresses indicated by the address data. Frame buffer 14 periodically controls deflection and z-axis control circuitry 118 in a raster scan mode to set illumination of pixels on the screen of CRT 12 in accordance with the data in the bit map RAM so as to produce the appropriate shaded backgrounds. Frame buffers for providing raster scan control of a CRT in response to input bit-mapped pixel data are well known and commonly employed.

A display list may also define a display of characters and lines of an indicator of FIG. 1 by indicating a sequence of strokes of the electron beam within CRT 12 needed to generate such characters and lines. In response to such a display list, display list processor 110 transmits a sequence of vector data to stroke generator 116. Stroke generator 116 stores this vector data and periodically causes the beam in CRT 12 to sweep out the characters and lines indicated by the stored vector data in a well-known manner.

Thus, frame buffer 114 and stroke generator 116 operate to provide a vector display superimposed over a bit map display. While it will be apparent to those skilled in the art that the characters and lines produced by the stroke generator 116 could also be produced by suitably adjusting the pixel data supplied to frame buffer 114, characters and lines produced on a CRT by a stroke generator are typically brighter than those provided by a bit-mapped display.

It should be understood that while the apparatus of FIG. 3 is illustrated as producing a monochrome display, it may be adapted to produce a color display by appropriately selecting elements 12, 114, 116 and 118 and the graphics firmware stored in ROM 112.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A primary flight display for an aircraft, comprising:
    means defining a display field including a central attitude director indicator,
    a vertically disposed, movable altitude scale on a first side of said central attitude director indicator, including a relatively fixed pointer provided with a window for digital display, and means responsive to the altitude of said aircraft for moving said scale relative to said pointer and generating said digital display indicating the altitude of said aircraft, wherein said scale is adjacent said central attitude director indicator and said pointer points toward said scale and said attitude director indicator,
    a vertically disposed, movable air speed scale on a second side of said central attitude display indicator opposite said first side, including a second relatively fixed pointer provided with a second window for digital display, and means responsive to the air speed of said aircraft for moving said air speed scale relative to said second pointer and generating said digital display for said second window indicating the air speed of said aircraft, wherein said air speed scale is adjacent said central attitude director indicator and said second pointer points toward said air speed scale and said attitude director indicator,
    a movable, arcuate heading scale adjacent and below said attitude director indicator, including a third relatively fixed pointer provided with a third window for digital display, and means responsive to the heading of said aircraft for moving said heading scale relative to said third pointer and generating said digital display for said third window indicating the heading of said aircraft, wherein said heading scale is adjacent said central attitude director indicator and said third pointer points toward said heading scale and said attitude director indicator, and
    a relatively fixed vertical speed scale on said first side of said central attitude display indicator adjacent said altitude scale and on the remote side of said altitude scale from said central attitude director indicator, including a fourth relatively movable pointer directed radially toward both said vertical speed scale and said altitude scale from an apparent origin on the remote side of said vertical speed scale from said altitude scale such that said fourth pointer changes radial direction as it moves along said vertical speed scale, and means responsive to the vertical speed of said aircraft for moving said fourth pointer along said vertical speed scale, wherein graduations along said vertical speed scale and said altitude scale are such that said fourth pointer simultaneously points toward a selected altitude and the vertical speed appropriate for attaining the selected altitude.

2. The primary flight display according to claim 1 wherein said arcuate heading scale has a given radius from an apparent center of curvature below said heading scale, and graduations along said heading scale indicating degrees of heading wherein the spacing of said graduations is different from the angle subtended at said apparent center of curvature by the arcuate spacing on said scale between graduations.

3. The primary flight display according to claim 2 wherein said means responsive to said heading generates said heading scale by sectors placed adjacent one another and providing a larger total angular difference along said heading scale than the angle subtended at said apparent center of curvature by said adjacent sectors.

4. The primary flight display according to claim I further including means providing markers along at least one of said scales, said markers being adjustable for providing pilot selected values, wherein said markers become substantially coincident with a corresponding pointer and digital display when a selected value is achieved, and wherein said markers are partially visible and are maintained in a stationary position when a pilot selected value exceeds the visible extent of the corresponding scale.

5. The primary flight display according to claim 1 wherein said means defining a display field includes means providing separate non-overlapping shading of areas of said display surrounding respective scales as a background for said scales to separate the same on said display as the sole demarcation of said areas.

6. A primary flight display for an aircraft, comprising:
means defining a display field, and
a movable, arcuate heading scale on said display field and a background therefor comprising a segment of a compass rose, including a relatively fixed pointer, and means responsive to heading information from said aircraft for moving said heading scale relative to said pointer.
wherein said arcuate heading scale has a given radius from an apparent center of curvature, and graduations along said heading scale, the spacing of said graduations being different from the angle subtended at said apparent center of curvature by the arcuate spacing on said scale between the same graduations, wherein the ratio of the subtended angle between graduations and the actual spacing between said graduations in degrees along the arcuate scale is greater than one, such that the total spacing in degrees between all the graduations along the acuate scale would be greater than 360 degrees, said means responsive to heading information for moving said heading scale being effective in response to a change in heading information for moving said heading scale by the number of degrees as indicated thereon equal to the change in heading, wherein said means responsive to heading information produces said heading scale by displaying limited sectors.

7. The primary flight display according to claim 6 wherein said relatively fixed pointer is provided with a digital display registering the aircraft heading in response to said housing information.

8. A primary flight display for an aircraft, comprising:
means defining a display field,
a movable altitude scale on said display field, including a fixed pointer, and means responsive to altitude information from said aircraft for moving said scale relative to said pointer to indicate the correct altitude,
a fixed vertical speed scale adjacent said altitude scale on said display field, including a relatively movable pointer directed toward both said vertical speed scale and said altitude scale, and
means responsive to the vertical speed information from said aircraft for moving said movable pointer so as to point at the aircraft's vertical speed while simultaneously pointing at a selected altitude on said altitude scale to be reached at said vertical speed.

9. The primary flight display according to claim 8 wherein said movable pointer is angularly movable from an apparent origin on the remote side of said vertical speed scale from said altitude scale.

10. The primary flight display according to claim 9 wherein said vertical speed scale is expanded between graduations toward zero vertical speed indication adjacent said fixed pointer.

11. The primary flight display according to claim 8 further including a pilot positionable, selected altitude marker along said altitude scale, said marker being movable with said altitude scale, whereby the pilot can substantially continuously direct said movable pointer toward said marker for smoothly decelerating said aircraft to a selected altitude in an optimized manner, as said selected altitude coincides with said fixed pointer.

12. A primary flight display for an aircraft, comprising:
means defining a display field,
an altitude scale on said display field including means responsive to altitude information from said aircraft for indicating the correct altitude on said altitude scale, and
a vertical speed indicator on said display field provided with means responsive to the vertical speed of said aircraft for indicating the vertical speed while simultaneously indicating the altitude on said altitude scale selected to be reached at said vertical speed.

* * * * *

UNITED STATES PATENT AND TRADEMARK OFFICE
CERTIFICATE OF CORRECTION

PATENT NO. : 4,860,007
DATED : August 22, 1989
INVENTOR(S) : MICHAEL L. KONICKE et al It is certified that error appears in the above-identified patent and that said Letters Patent is hereby corrected as shown below:

Column 9, line 30, "I" should be --1--.

Column 9, line 54, "." should be --,--.

Column 10, line 15, "housing" should be --heading--.

Signed and Sealed this

Ninth Day of October, 1990

Attest:

HARRY F. MANBECK, JR.

Attesting Officer

Commissioner of Patents and Trademarks